United States Patent
Kudo

(10) Patent No.: US 11,840,608 B2
(45) Date of Patent: Dec. 12, 2023

(54) SILICONE AND A METHOD FOR PREPARING THE SAME

(71) Applicant: Shin-Etsu Chemical Co., Ltd., Tokyo (JP)

(72) Inventor: Muneo Kudo, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 20 days.

(21) Appl. No.: 17/636,054

(22) PCT Filed: Aug. 12, 2020

(86) PCT No.: PCT/JP2020/030674
§ 371 (c)(1),
(2) Date: Feb. 17, 2022

(87) PCT Pub. No.: WO2021/033604
PCT Pub. Date: Feb. 25, 2021

(65) Prior Publication Data
US 2022/0289888 A1 Sep. 15, 2022

(30) Foreign Application Priority Data

Aug. 21, 2019 (JP) ................................. 2019-151060
Mar. 11, 2020 (JP) ................................. 2020-041941

(51) Int. Cl.
| C08G 77/46 | (2006.01) |
| C08G 77/20 | (2006.01) |
| C08F 290/06 | (2006.01) |
| C08G 77/12 | (2006.01) |

(52) U.S. Cl.
CPC .......... *C08G 77/46* (2013.01); *C08F 290/068* (2013.01); *C08G 77/20* (2013.01); *C08G 77/12* (2013.01)

(58) Field of Classification Search
CPC .................................................... C08F 230/08
See application file for complete search history.

(56) References Cited

U.S. PATENT DOCUMENTS

| 10,786,440 | B2 * | 9/2020 | Iyoku | .................... | C08F 299/08 |
| 2009/0007483 | A1 * | 1/2009 | Hansel | .................... | C08G 77/46 |
| | | | | | 528/10 |
| 2009/0234089 | A1 | 9/2009 | Ueyama et al. | | |
| 2014/0066540 | A1 * | 3/2014 | Ueyama | .................... | C08G 77/46 |
| | | | | | 556/437 |
| 2016/0311981 | A1 | 10/2016 | Kudo | | |

FOREIGN PATENT DOCUMENTS

| JP | 2008/195891 | * | 8/2008 |
| JP | 5490547 B2 | | 3/2014 |
| JP | 2016204534 A | | 12/2016 |
| JP | 6236059 B2 | | 11/2017 |
| JP | 2018065969 A | | 4/2018 |
| WO | 2013142062 A2 | | 9/2013 |
| WO | WO 2017/130257 A1 | * | 8/2017 |

OTHER PUBLICATIONS

Machine translation of JP 2008/195891 (no date).*
English translation of International Search Report corresponding to International Patent Application No. PCT/JP2020/030674 (2 pages) (dated Oct. 20, 2020).

* cited by examiner

Primary Examiner — Marc S Zimmer
(74) Attorney, Agent, or Firm — Myers Bigel, P.A.

(57) ABSTRACT

One of the purposes of the present invention is to provide a silicone which has polymerizable groups at the both terminals and an amphiphilic side chain and which provides a copolymer having high surface wettability. The present invention provides a silicone represented by the formula (1): in the formula (1) $R^1$ is a group represented by the following formula (2): wherein n is an integer of 2 to 8 and $R^4$ is a methyl group or a hydrogen atom, "a" is an integer of 1 to 500, b is an integer of 1 to 100, provided that a+b is 50 to 600, the siloxane units in the aforesaid parentheses may be bonded in a block or at random, $R^2$ is, independently of each other, a substituted or unsubstituted monovalent hydrocarbon group having 1 to 10 carbon atoms, $R^3$ is, independently of each other, an alkyl group having 1 to 6 carbon atoms, $A^1$ is a group represented by the formula (3) or (3'): wherein R is a hydrogen atom or a methyl group, $B^1$ is a hydrogen atom, an alkyl group having 1 to 6 carbon atoms, an aralkyl group having 7 to 12 carbon atoms, or an acyl group having 1 to 6 carbon atoms, m is an integer of 0 to 8, p is an integer of 1 to 10, q is an integer of 1 to 50, and the polyether units in the parentheses are bonded in the above-described order.

20 Claims, No Drawings

SILICONE AND A METHOD FOR PREPARING THE SAME

TECHNICAL FIELD

The present invention relates to a silicone and a method for preparing the same, particularly a silicone which is useful as starting materials for preparing ophthalmic devices and a method for preparing the same. Specifically, the present invention relates to a silicone which has (meth)acryl groups at the both terminals and is copolymerizable with other polymerizable monomer for preparing ophthalmic devices to form a crosslinking structure to thereby provide a polymer having a flexibility and being suitable for an ophthalmic devices such as contact lenses e.g. hydrophilic contact lenses and silicone hydrogels, intraocular lenses and artificial corneas, and a method for preparing the silicone.

BACKGROUND OF THE INVENTION

Various polymerizable silicone monomers which are useful as starting materials for preparing ophthalmic devices having oxygen permeability and hydrophilicity, in particular starting materials for contact lenses, has been developed. Specifically, a polysiloxane having polymerizable groups at the both terminals and a hydrophilic side chain is developed as starting materials for contact lenses having high oxygen permeability.

For example, Patent Literature 1 describes a hydrophilic polysiloxane macromonomer represented by the following formula (1):

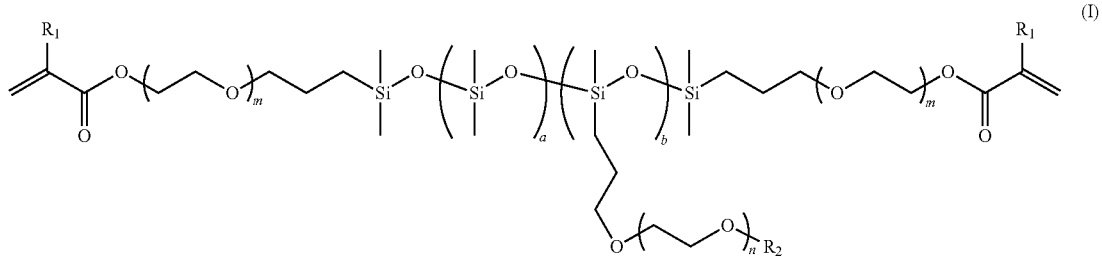

wherein $R_1$ is selected from hydrogen or a methyl group, $R^2$ is selected from hydrogen or a hydrocarbon group having 1 to 4 carbon atoms, in is an integer of 0 to 10, n is an integer of 4 to 100, a and b are each an integer of 1 or more, a+b is 20 to 500, b/(a+b) is 0.01 to 0.22, and the siloxane units in the parentheses may be sequenced at random.

Patent Literature 2 describes a hydrophilic contact lens prepared by polymerizing a polysiloxane having a polymerizable group at both terminals and further having a hydrophilic side chain. As the hydrophilic side chain, the groups represented by the following formulas (a) and (b) are described.

wherein $R^L$ is a linking residue derived from non-isomerizable hydrosilylation-able terminal olefin comprising a general structure $-CH_2-C(R^bR^7)-(CR^8R^9)_n-$, n is selected from integers of 1 to 10; $R^7$, $R^8$ and $R^9$ are independently selected from hydrogen and a monovalent hydrocarbon radical having 1 to 10 carbon atoms and, optionally, a heteroatom; $R^b$ is selected from monovalent hydrocarbon radicals with 1 to 6 carbon atoms, and $R^P$ is a polyether group with the general formula: $-O(CH_2CH_2O)_b(CH_2CH(CH_3)O)_c(CH_2CH_2CH_2CH_2O)_d-$, wherein b is 1 to 100, c is 0 to 100, d is 0 to 100, and b+c+d>0;

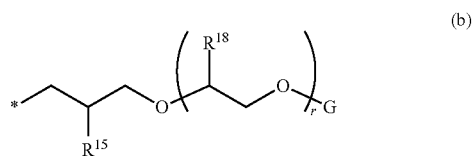

wherein the site indicated by "*" is a position of bonding to a silicon atom, $R^{16}$ is, independently of each other, selected from hydrogen and methyl, ethyl, isopropyl, phenyl, phenylmethyl, naphthyl, naphthyhnethyl, and $-CH_2CH_2CF_3$ radicals, $R^{15}$ is methyl, G is, independently of each other, selected from hydrogen and alkyl, and aralkyl residues, and r is, independently of each other, 0 to 50.

PRIOR LITERATURES

Patent Literatures

Patent Literature 1: Japanese Patent No. 5490547
Patent Literature 2: Japanese Patent No. 6236059

SUMMARY OF THE INVENTION

Problems to be Solved by the Invention

However, surface wettability is insufficient in the ophthalmic devices made of the hydrophilic polysiloxane macromonomer represented by the formula (1) or the polysiloxane having a hydrophilic side chain as represented by the formula (a) or (b). The present invention has been made in the aforesaid circumstances. One of the purposes of the present invention is to provide a silicone which has polymerizable groups at the both terminals and an amphiphilic side chain and which provides a copolymer having high surface wettability.

Means for Solving the Problems

The present inventor has made research to solve the afore-mentioned problems and have found that a silicone which is represented by the following formula (1) and has an amphiphilic side chain having hydrophilicity on account of a block structure of ethyleneoxy units and lipophilicity on account of a block structure of butyleneoxy units provides a copolymer having high surface wettability, without an expensive secondary treatment, such as plasma oxidation, or plasma coating or an internal wetting agent to improve wettability of the copolymer.

Further, the present inventors have found that the silicone represented by the following formula (I) is obtained by an addition-reaction of an organohydrogenpolysiloxane represented by the following formula (4) and a compound represented by the following formula (5) or (5').

That is, the present invention provides a silicone represented by the following formula (1):

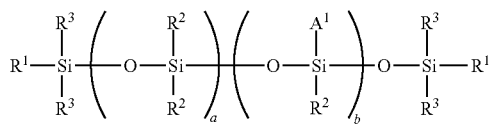
(1)

wherein $R^1$ is a group represented by the following formula (2):

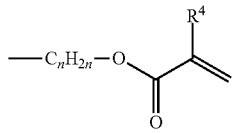
(2)

wherein n is an integer of 2 to 8 and $R^4$ is a methyl group or a hydrogen atom, "a" is an integer of 1 to 500, b is an integer of 1 to 100, provided that a+b is 50 to 600, the siloxane units in the aforesaid parentheses may be bonded in a block or at random, $R^2$ is, independently of each other, a substituted or unsubstituted monovalent hydrocarbon group having 1 to 10 carbon atoms, $R^3$ is, independently of each other, an alkyl group having 1 to 6 carbon atoms, $A^1$ is a group represented by the following formula (3) or (3');

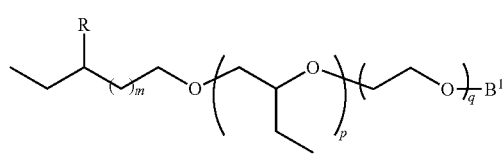
(3)

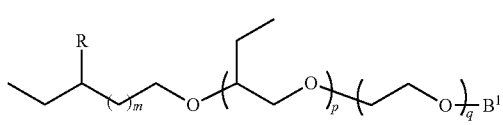
(3')

wherein R is a hydrogen atom or a methyl group, B' is a hydrogen atom, an alkyl group having 1 to 6 carbon atoms, an aralkyl group having 7 to 12 carbon atoms, or an acyl group having 1 to 6 carbon atoms, m is an integer of 0 to 8, p is an integer of 1 to 10, q is an integer of 1 to 50, and the polyether units in the parentheses are bonded in the above-described order.

The present invention further provides a method for preparing a silicone represented by the aforesaid formula (1) and the method comprises a step of addition-reacting an organohydrogenpolysiloxane represented by the following formula (4):

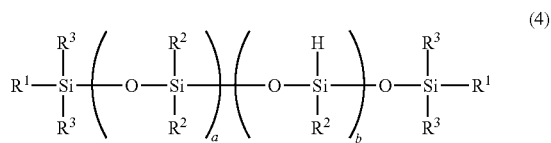
(4)

wherein $R^1$, $R^2$, $R^3$, a and b are as defined above, with a compound represented by the following formula (5) or (5'):

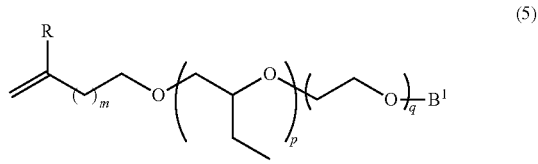
(5)

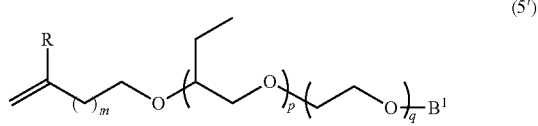
(5')

wherein R is a hydrogen atom or a methyl group, $B^1$ is a hydrogen atom, an alkyl group having 1 to 6 carbon atoms, an aralkyl group having 7 to 12 carbon atoms, or an acyl group having 1 to 6 carbon atoms, m is an integer of 0 to 8, p is an integer of 1 to 10, q is an integer of 1 to 50, and the polyether units in the parentheses are bonded in the above-described order, to obtain the silicone represented by the formula (1).

Effects of the Invention

The silicone of the present invention provides a copolymer having high surface wettability, without an expensive secondary treatment, such as plasma oxidation or plasma coating, or an internal wetting agent to improve the wettability of the copolymer. Thus, the present silicone is useful for preparing ophthalmic devices, such as contact lens materials, intraocular lens materials, and artificial corneal materials.

DETAILED DESCRIPTION OF THE INVENTION

The present silicone is represented by the following formula (1), and has a polymerizable group represented by the following formula (2) at both terminals, and has a group represented by the following formula (3) or (3') as an amphiphilic side chain.

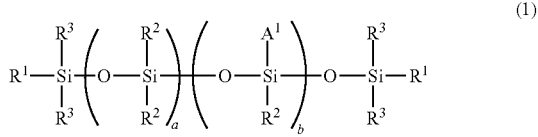
(1)

wherein R¹ is a group represented by the following formula (2):

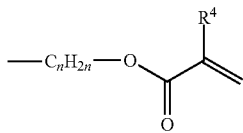

(2)

wherein n is an integer of 2 to 8 and R⁴ is a methyl group or a hydrogen atom, "a" is an integer of 1 to 500, b is an integer of 1 to 100, provided that a+b is 50 to 600, the siloxane units in the aforesaid parentheses may be bonded in a block or at random, R² is, independently of each other, a substituted or unsubstituted monovalent hydrocarbon group having 1 to 10 carbon atoms, R³ is, independently of each other, an alkyl group having 1 to 6 carbon atoms, A¹ is a group represented by the following formula (3) or (3'):

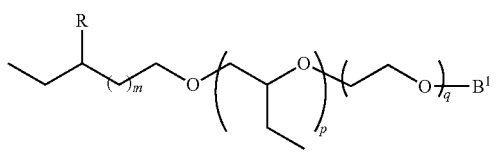

(3)

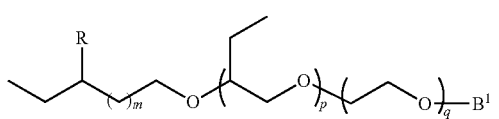

(3')

wherein R is a hydrogen atom or a methyl group, B¹ is a hydrogen atom, an alkyl group having 1 to 6 carbon atoms, an aralkyl group having 7 to 12 carbon atoms, or an acyl group having 1 to 6 carbon atoms, m is an integer of 0 to 8, p is an integer of 1 to 10, q is an integer of 1 to 50, and the polyether units in the parentheses are bonded in the above-described order. B¹ is preferably a hydrogen atom or an alkyl group having 1 to 6 carbon atoms, more preferably a hydrogen atom or a methyl group.

A¹ is preferably represented by any one of the following formulas:

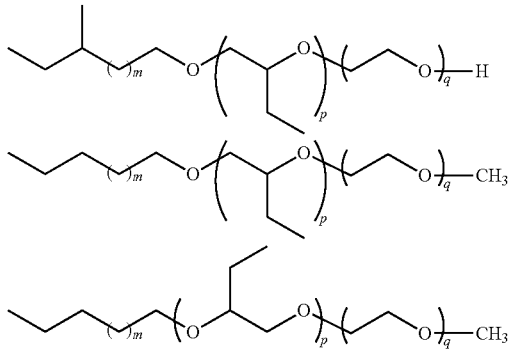

The group represented by the aforesaid formula (3) or formula (3') is an amphiphilic side chain having hydrophilicity on account of the block structure of ethyleneoxy units and lipophilicity on account of the block structure of butyleneoxy units. On account of this amphiphilic side chain, the present silicone provides a copolymer having high surface wettability, without an expensive secondary treatment, such as plasma oxidation or plasma coating, or an internal wetting agent to improve the wettability of a copolymer. In particular, the (poly)butylene oxide moiety and the (poly)ethylene oxide moiety bond together in the above-described order in the silicone and, thereby, the hydrophilic groups are oriented and localized on the outermost surface of an obtained cured product, so that the surface wettability of the copolymer is improved.

If the ethyleneoxy units and the butyleneoxy units are bonded at random, or if the block structure of butyleneoxy units is replaced by a structure of ethyleneoxy units or propyleneoxy units, or if the block structure of ethyleneoxy units and the block structure of butyleneoxy units are arranged in the reversed order, (that is, if the block structure of butyleneoxy units is on the terminal side of the formula (3) or (3')), such a copolymer would have insufficient surface wettability. By ¹H-NMR, ¹³C-NMR or mass spectrometry, it may be confirmed that the ethyleneoxy units and the butyleneoxy units constitute each block structure, which are bonded in the aforesaid order.

In the formulas (3) and (3'), p is an integer of 1 to 10, preferably an integer of 3 to 8; q is 1 to 50, preferably an integer of 10 to 30; m is an integer of 0 to 8, preferably an integer of 0 to 3, particularly preferably 1. The (poly) oxyalkylene units in the aforesaid parentheses are required to bond together in the order as described in the aforesaid formula (3) or (3'). If the block structure of ethyleneoxy units and the block structure of butyleneoxy units are arranged in the reversed order, such a copolymer would have insufficient surface wettability.

In the formula (2), n is an integer of 2 to 8, preferably 3 or 4, and R⁴ is a methyl group or a hydrogen atom.

In the aforesaid formula (1), is, independently of each other, a substituted or unsubstituted, monovalent hydrocarbon group having 1 to 10 carbon atoms, preferably 1 to 6 carbon atoms. Examples of the monovalent hydrocarbon group include an alkyl group such a methyl group, an ethyl group, a propyl group, a butyl group, a pentyl group and a hexyl group; cycloalkyl group such as a cyclohexyl group; an aryl group such as a phenyl group, a tolyl group and a naphthyl group; an aralkyl group such as a benzyl group, a phenylethyl group and a phenyipropyl group; and an alkenyl group such as a vinyl group and an allyl group; and those hydrocarbon groups wherein a part or all of the hydrogen atoms bonded to the carbon atoms are substituted with a substituent such as a halogen atom such as a fluorine atom and a chlorine atom, e.g., halogen-substituted monovalent hydrocarbon groups such as trifluoropropyl group. Among these, a methyl group is preferred.

In the aforesaid formula (1), R³ is, independently of each other, an alkyl group having 1 to 6 carbon atoms, preferably 1 to 4 carbon atoms, such as a methyl group, an ethyl group, a propyl group, a butyl group, a pentyl group and a hexyl group. Among these, a methyl group is preferred.

In the formula (1), a is an integer of from 1 to 500, preferably 50 to 300, b is an integer of 1 to 100, preferably an integer of 2 to 40, provided that a+b is 50 to 600, preferably 60 to 400, particularly preferably 70 to 300. If a total of a and b is less than the aforesaid lower limit, it is difficult to provide a polymer having proper flexibility. If the total of a and b is more than the aforesaid upper limit, the silicone is poor compatible with another hydrophilic monomer. In particular, it is preferred in view of a valance of the hydrophilicity and a hydrophobicity of a siloxane that each of the number of a and b is in the aforesaid range and the ratio of a to b is 10 to 50. In the formula (1), the siloxane units in the parentheses may be sequenced at random or form a block.

The silicone represented by the aforesaid formula (1) is obtained by an addition-reaction of the organohydrogenpolysiloxane represented by the following formula (4) and a compound represented by the following formula (5) or (5'). The present method will be described below in more detail.

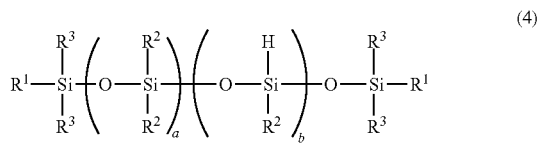

(4)

wherein $R^1$, $R^2$, $R^3$, a and b are as defined above,

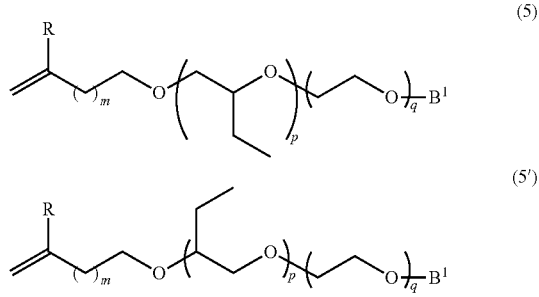

(5)

(5')

wherein R is a hydrogen atom or a methyl group, $B^1$ is, independently of each other, a hydrogen atom, an alkyl group having 1 to 6 carbon atoms, an aralkyl group having 7 to 12 carbon atoms, or an acyl group having 1 to 6 carbon atoms, in is an integer of 0 to 8, p is an integer of 1 to 10, q is an integer of 1 to 50, and the polyether units in the parentheses are bonded in the above-described order. $B^1$ is preferably a hydrogen atom or an alkyl group having 1 to 6 carbon atoms, more preferably a hydrogen atom or a methyl group. The present invention provides the preparation method comprising a step of conducting the addition-reaction to obtain the silicone represented by the aforesaid formula (1).

In the preparation method of the present invention, the compound represented by the aforesaid formula (5) or (5') preferably has a branched alkyl group at position β of the terminal olefin group. Particularly, in is 1 in the aforesaid formula (5) or (5'). Formation of impurities is decreased by that the raw material olefin compound has a branched alkyl group at position β of the terminal olefin group. Generally, a silicone having a polyether moiety in the side chain is prepared by a hydrosilylation reaction of an organohydrogenpolysiloxane with an olefin group-containing polyether. If the raw material compound does not have a branched alkyl group at position β of the olefin group, a side reaction occurs whereby isomerization takes place at the double bond. The isomerized polyether does not cause an addition-reaction and is an impurity. Further, such a polyether having an olefine group must be used in an excess amount so as to complete the addition-reaction, which may be a cause of an impurity. These impurities are not easily separated and sometimes adversely affect the mechanical properties of the resulting polymer.

The olefin compound represented by the aforesaid formula (5) or (5') is obtained by any known preparation method. For example, the olefin compound is prepared by reacting an unsaturated alcohol with butylene oxide in the presence of a catalyst selected from basic catalysts, Lewis acid catalysts, and composite metal oxide catalysts, followed by reaction with ethylene oxide.

Examples of the compound represented by the formula (5) include compounds represented by the following formulas:

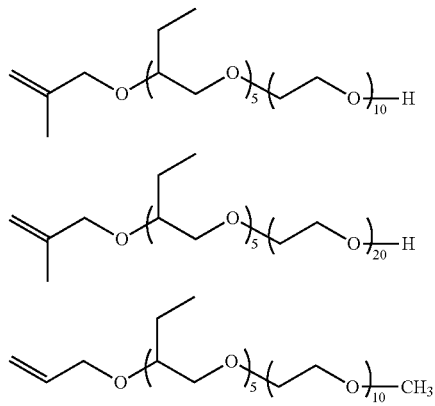

Examples of the compound represented by the formula (5') include compounds represented by the following formulas:

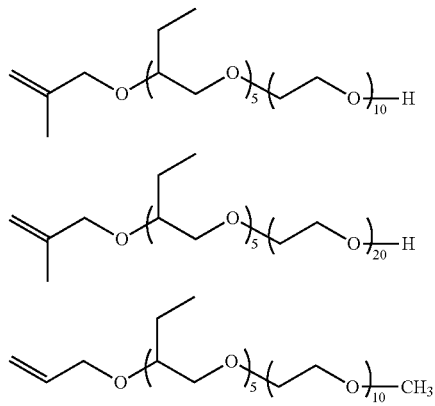

The organohydrogenpolysiloxane represented by the formula (4) is prepared in any known manners. In particular, (meth)acrylic silicone dimer is used as a starting material for making a terminal. The (meth)acrylic silicone dimer is, for instance, represented by the following formula (8):

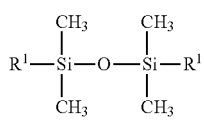

(8)

In the aforesaid formula (8), R' is a group represented by the following formula (2):

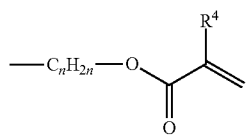

(2)

wherein n is an integer of 2 to 8 and $R^4$ is a methyl group or a hydrogen atom.

Examples of the (meth)acrylic silicone dimer represented by the aforesaid formula (8) include a compound represented by the following formula (9).

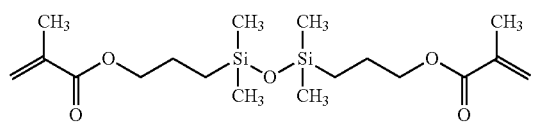

(9)

For instance, the compound represented by the formula (9), 1,1,3,3,5,5,7,7-octamethyltetrasiloxane and 1,3,5,7-tetramethyltetrasiloxane are mixed in a proper amount and subjected to an equilibration reaction in the presence of a trifluoromethanesulfonie acid catalyst. Subsequently, the reaction mixture is neutralized and generated components having a low boiling temperature are stripped off at a reduced pressure to obtain an organohydrogenpolysiloxane represented by the following formula (10).

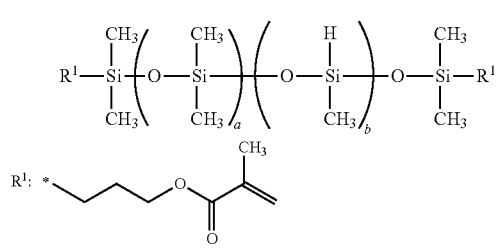

(10)

wherein the site indicated by "*" is a position of bonding to the silicon atom and a and b are as defined above.

The addition-reaction of the organohydrogenpolysiloxane represented by the formula (4) and the compound represented by the aforesaid formula (5) or (5') may be carried out in any conventional manners. For instance, the reaction is carried out in the presence of a hydrosilylation catalyst such as platinum group metal compounds. A solvent may be used. Examples of the solvent include aliphatic or aromatic solvents such as hexane, methylcyclohexane, ethylcyclohexane and toluene; and alcoholic solvents such as ethanol and IPA.

It is preferred that the compound represented by the formula (5) or (5') is optionally diluted with a solvent to which, then, a hydrosilylation catalyst of platinum family is added. The amount of the compound represented by the formula (5) or (5') is preferably such that a ratio of the number of unsaturated group in the compound represented by the formula (5) or (5') to the number of SiH group in the organohydrogenpolysiloxane represented by the formula (4) is 1 to 2. The type of the platinum hydrosilylation catalyst is not particularly limited, and conventionally known ones may be used. The amount of platinum is preferably 2 to 500 ppm based on the total mass of the reaction substrate and solvent.

Subsequently, the organohydrogenpolysiloxane represented by the formula (4) is added dropwise to the mixture to react at room temperature or a higher temperature. After the completion of the addition, the reaction mixture is held under heating. An amount of remaining SiH group in the reaction liquid is determined in a known manner to confirm the end point of the reaction. For instance, a determination of an amount of a hydrogen gas generated is conducted to determine an amount of remaining SiH group. After the end point of the reaction is confirmed, the solvent is removed from the reaction liquid. The unreacted organohydrogenpolysiloxane does not remain in a product, so that a silicone obtained has one specific structure at a higher ratio. The aforesaid addition-reaction may be conducted in one step.

After the completion of the addition-reaction, an excessive compound (5) or (5') is removed from the reaction liquid. For instance, the reaction liquid is subjected to stripping under a reduced pressure, or washed with ion exchanged water or an aqueous sodium sulfate solution to extract the compound (5) or (5') into an aqueous phase. Here, a proper amount of solvent, such as toluene, hexane and acetone may preferably be used to attain clear phase separation. Further, it is preferable that the silicone or silicone solution is treated with an adsorbent such as an activated carbon or a silica gel for purification, or treated with a filter such as a filter paper or a filter plate for improving appearance. Although the product obtained by the addition-reaction of the compound (4) and the compound (5) or (5') may be colored, a colorless transparent compound may be obtained by purifying with the adsorbent and/or the filter.

In the aforesaid reaction, a polymerization inhibitor may be added, if needed. Any conventional polymerization inhibitor for a (meth)acryl compound may be used, such as, for instance, a phenol type polymerization inhibitor such as hydroquinone, hydroquinone monomethyl ether, 2-tert-butyl hydroquinone, 4-methoxy phenol and 2,6-di-tert-butyl-4-methylphenol(BHT). These may be used singly or two or more of them may be used in combination. The amount is preferably 5 to 500 ppm, further preferably 10 to 100 ppm, based on an amount of compound to be obtained, but is not limited to these.

The present silicone represented by the formula (1) is copolymerized with other monomers to prepare a polymer. Examples of the monomers include acrylic momoners such as (meth)acrylic acid, methyl(meth)acrylate, ethyl(meth) acrylate, polyalkylene glycol mono(meth)acrylate, polyalkylene, glycol monoalkyl ether (meth)acrylate, trifluoroethyl(meth)acrylate, 2-hydroxyethyl(meth)acrylate, and 2,3-dihydroxypropyl(meth)acrylate; acrylic acid derivatives such as N,N-dimethylacrylamide, N,N-diethylacrylamide, N-acryloylmorpholine, and N-methyl(meth)acrylamide; and other unsaturated aliphatic or aromatic compounds such as crotonic acid, cinnamic acid, vinyl benzoic acid; and polymerizable group-containing silicone compounds. The acrylic monomer and an acrylic acid derivative are preferred. The present silicone is polymerized with one or more kinds selected from the aforesaid monomers to prepare a polymer.

In the preparation of a copolymer comprising a repeating unit derived from the silicone of the present invention and another polymerizable monomer, an amount of the present silicone is 1 to 70 parts by mass, preferably 10 to 60 parts by mass, relative to a total 100 parts by mass of the present silicone and the polymerizable monomer. The present silicone may be polymerized singly so as to make a polymer.

The copolymerization of the present compound and other polymerizable monomer mentioned just above may be carried out in conventional known manners. For instance, known polymerization initiator such as thermal polymerization initiators or photo polymerization initiators may be used. Examples of the polymerization initiator include 2-hydroxy-2-methyl-1-phenyl-propane-1-one, azobis(isobutyronitrile), azobis(dimethylvaleronitrile), benzoyl peroxide, tert-butyl hydroperoxide, and cumene hydroperoxide. The polymerization initiator may be used singly or two or more of them may be used in combination. The amount of the polymerization initiator is 0.001 to 2 parts by mass, preferably 0.01 to 1 part by mass, relative to 100 parts by mass of a total amount of the polymerizable components.

The polymer containing the repeating unit derived by the compound of the present invention has excellent surface wettability. Therefore, the present silicone is suitable as materials for preparing ophthalmic devices such as contact lenses, e.g. hydrophilic contact lenses and silicone hydrogels, intraocular lenses and artificial corneas. A method for preparation of the ophthalmic device with the present polymer may be any conventional ones. For instance, a machining method and a molding method may be used for forming lenses such as contact lenses and intraocular lenses.

EXAMPLES

The present invention will be explained below in further detail with reference to a series of the Examples and the Comparative Examples, though the present invention is in no way limited by these Examples.
In the following descriptions, $^1$H-NMR analysis was conducted by JNM-ECP500, ex JEOL Ltd. with deuterated acetone as a measuring solvent.

Example 1

In a 1-liter flask equipped with a stirring device, a dimroth condenser, a thermometer and a dropping funnel, put were 113.4 g (0.128 mol) of the compound represented by the following formula (6) and 430.0 g of toluene and heated to 70 degrees C. 2.14 Grams of a solution of a complex of alkali-neutralized chloroplatinic acid with vinyl siloxane, in toluene, containing 0.5% of platinum, was added in the flask. The amount of platinum was 100 ppm based on the total mass of the reaction substrate and the solvent. Then, 100.0 g (0.0142 mol) of the compound represented by the following formula (11) was added dropwise in the flask through the dropping funnel over two hours. Thus, a ratio of the number of the unsaturated hydrocarbon group in the compound represented by formula (6) to the number of the SiH group in the compound represented by the following formula (11) was 1.5. The reaction mixture was held at 70 degrees C. for 7 hours and, then, the amount of the remaining SiH group in the reaction mixture was determined by the method described below. The amount of the remaining SiH group was 2% or less of the amount of the SiH group before the reaction, which means that the reaction was completed. The toluene was stripped off at a reduced pressure to obtain 209.4 g of an oily crude product.

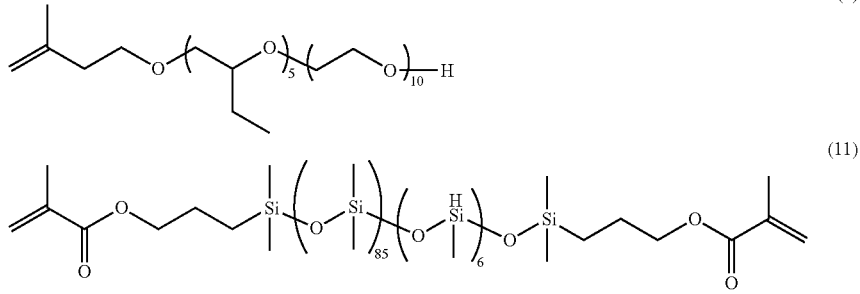

In the aforesaid formula. (6), butylene oxide and ethylene oxide formed each one block structure and bonded in the aforesaid order.

The amount of the remaining SiH group was determined in the following manner.

Precisely 10 grams of a sample is placed in a 100-milliliter Meyer flask and dissolved in 10 ml of n-butanol, to which 20 ml of a 20% aqueous solution of sodium hydroxide is gradually added, so that hydrogen gas generates. The amount of the hydrogen gas generated is determined with a gas burette and reduced to an amount at 0 degree C. and 1 atom according to the following formula:

Amount of the hydrogen gas generated, ml/g,=0.359×P× V/T×S, wherein P is a pressure in the determination, mmHg, V is an amount of the hydrogen gas generated, ml; T is 273+t, wherein t is a temperature, ° C., of the hydrogen gas generated, equal to a temperature in the determination; and S is an amount of the sample.

To the oily crude product obtained, 300 g of acetone and 100 g of water were added, and the mixture was stirred, followed by standing and separation to obtain a silicone layer as a lower phase. The washing procedure was repeated further twice. The compound represented by the formula (6) was extracted in a water/acetone phase to be removed. 100 Grams of 1-propanol, 0.01 g (100 ppm) of 4-methoxyphenol, and 0.01 g (100 ppm) of 2,6-di-t-butyl-4-methylphenol were added to 240 g of the cloudy lower layer from the extraction, followed by filtration through a filter plate. The resulting filtrate was subjected to a stripping at a reduced pressure to obtain 105.2 g of a colorless and transparent oily product which was a highly viscous. A yield was 64.0%. $^1$H-NMR analysis showed that the product was a silicone represented by the following formula (12), hereinafter referred to as silicone 1. In the following formula (12), butylene oxide and ethylene oxide formed each one block structure and bonded in the order as described below.

(12)

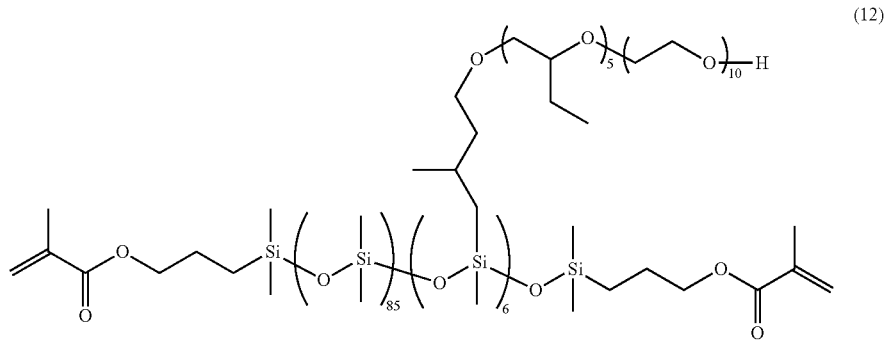

¹H-NMR spectra data of silicone 1 were as shown below. 0.1 ppm (540H), 0.5-0.6 ppm (16H), 0.9 ppm (90H), 1.05 ppm (18H), 1.4-1.8 ppm (76H), 1.9 ppm (12H), 3.3-3.7 ppm (342H), 4.1 ppm (4H), 5.5 ppm (2H), 6.1 ppm (2H)

¹H-NMR spectra data of silicone 2 were as shown below. 0.1 ppm (540H), 0.5-0.6 ppm (16H), 0.9 ppm (90H), 1.05 ppm (18H), 1.4-1.8 ppm (76H), 1.9 ppm (12H), 3.3-3.7 ppm (582H), 4.1 ppm (4H), 5.5 ppm (2H), 6.1 ppm (2H)

Example 2

The procedures of Example 1 were repeated, except that 169.7 g (0.128 mol) of a compound represented by the following formula (7) was used in place of the compound represented by the formula (6) to thereby obtain 119.2 g of a colorless and transparent silicone which was a highly viscous. A yield was 56.0%. A ratio of the number of the unsaturated hydrocarbon group in the compound represented by formula (7) to the number of the SiH group in the compound represented by the formula (11) was 1.5, ¹H-NMR analysis showed that the product was a silicone represented by the following formula (13), hereinafter referred to as silicone 2. In the following formulas (7) and (13), butylene oxide and ethylene oxide formed each one block structure and bonded in the order as described below.

Example 3

The procedures of Example 1 were repeated, except that 37.5 g (0.042 mol) of the compound (6) was used and 100.0 g (0.0141 mol) of the compound represented by the following formula (14) was used in place of the compound represented by the aforesaid formula (11) to thereby obtain 81.3 g of a colorless and transparent silicone which was a highly viscous. A yield was 65%. A ratio of the number of the unsaturated hydrocarbon group in the compound represented by formula (6) to the number of the SiH group in the compound represented by the formula (14) was 1.5. ¹H-NMR analysis showed that the product was a silicone represented by the following formula (15), hereinafter referred to as silicone 3. In the following formula (15), butylene oxide and ethylene oxide formed each one block structure and bonded in the order as described below.

(7)

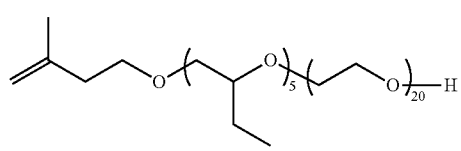

(13)

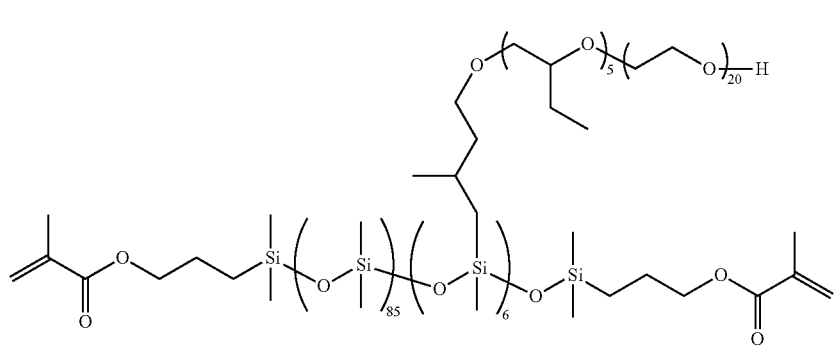

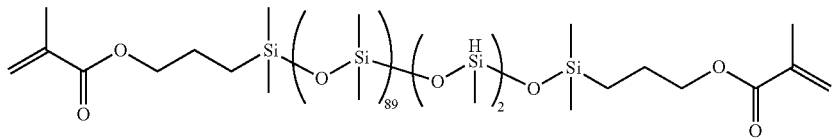

(14)

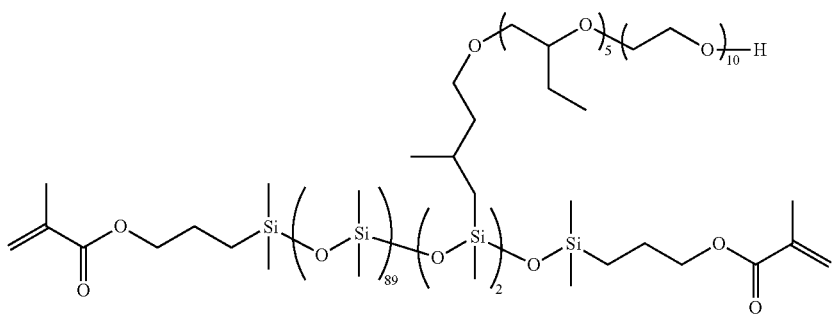

(15)

¹H-NMR spectra data of silicone 3 were as shown below. 0.1 ppm (552H), 0.5-0.6 ppm (8H), 0.9 ppm (30H), 1.05 ppm (6H), 1.4-1.8 ppm (28H), 1.9 ppm (8H), 3.3-3.7 ppm (114H), 4.1 ppm (4H), 5.5 ppm (2H), 6.1 ppm (2H)

¹H-NMR spectra data of silicone 4 were as shown below. 0.1 ppm (552H), 0.5-0.6 ppm (8H), 0.9 ppm (30H), 1.05 ppm (6H), 1.4-1.8 ppm (28H), 1.9 ppm (8H), 3.3-3.7 ppm (194H), 4.1 ppm (4H), 5.5 ppm (2H), 6.1 ppm (2H)

Example 4

The procedures of Example 1 were repeated, except that 55.7 g (0.042 mol) of a compound represented by the following formula (7) was used in place of the compound represented by the formula (6) and 100.0 g (0.0141 mol) of the compound represented by the aforesaid formula (14) was used in place of the compound represented by the aforesaid formula (11) to thereby obtain 81.1 g of a colorless and transparent silicone which was a highly viscous. A yield was 59%. A ratio of the number of the unsaturated hydrocarbon group in the compound represented by formula (7) to the number of the SiH group in the compound represented by the formula (14) was 1.5. ¹H-NMR analysis showed that the product was a silicone represented by the following formula (16), hereinafter referred to as silicone 4. In the following formula (16), butylene oxide and ethylene oxide formed each one block structure and bonded in the order as described below.

Comparative Example 1

The procedures of Example 1 were repeated, except that 56.1 g (0.128 mol) of the compound represented by the following formula (17) was used in place of the compound represented by the formula (6) to thereby obtain 98.8 g of an oily product which was pale brown and transparent. A yield was 72%. A ratio of the number of the unsaturated hydrocarbon group in the compound represented by formula (17) to the number of the SiH group in the compound represented by the formula (11) was 1.5. ¹H-NMR analysis showed that the product was a silicone represented by the following formula (18), hereinafter referred to as silicone 5.

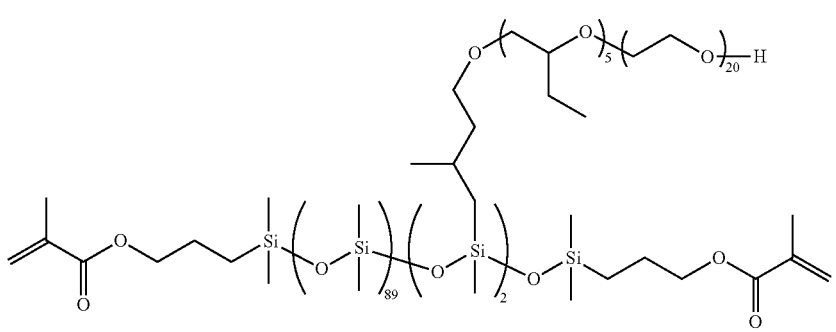

(16)

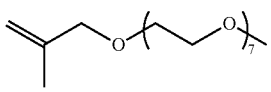

(17)

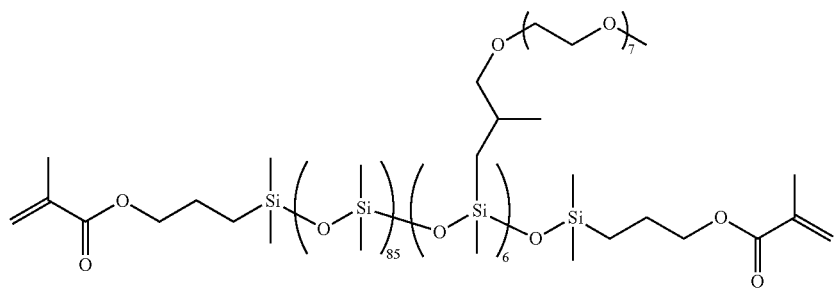

(18)

Comparative Example 2

The procedures of Example 1 were repeated, except that 104.4 g (0.128 mol) of the compound represented by the following formula (19) was used in place of the compound represented by the formula (6) to thereby obtain 113.5 g of an oily product which was pale brown and transparent. A yield was 67%. A ratio of the number of the unsaturated hydrocarbon group in the compound represented by formula (19) to the number of the SIR group in the compound represented by the formula (11) was 1.5. $^1$H-NMR analysis showed that the product was a silicone represented by the following formula (20), hereinafter referred to as silicone 6. In the following formulas (19) and (20), propylene oxide and ethylene oxide formed each one block structure and bonded in the order as described below, mercury lamp to cause curing. The cured product was soaked in isopropanol, a 50% isopropanol aqueous solution, and then deionized water for washing, so that a hydrogel film was obtained. The properties of the obtained hydrogel film were determined according to the following methods. The results are as shown in Table 1.

Equilibrium Water Content

Each of the films was soaked in deionized water at 25 degrees C. for 48 hours and, then, water on the surface of the film was wiped away. Thus, the hydrated film was formed. The hydrated film was weighed. Subsequently, the hydrated film was dried at 50 degrees C. for 48 hours and further at 25 degrees C. for 24 hours in an oven, and the mass of the dried film was weighed. The equilibrium water content was calculated according to the following equation. Equilibrium water content (%)=100×(mass of the hydrated film−mass of the dried film)/mass of the hydrated film

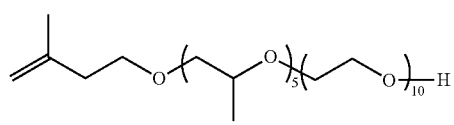

(19)

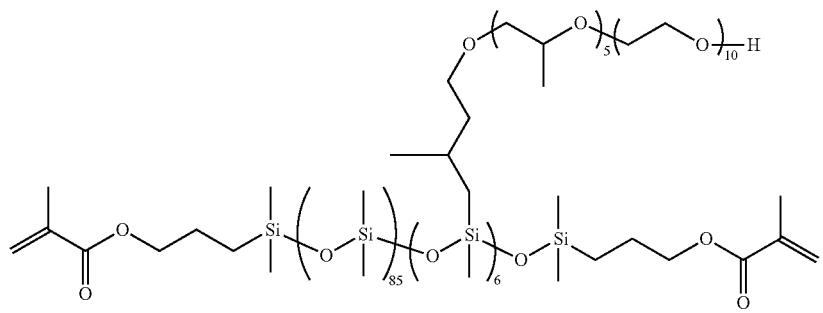

(20)

Examples 5 to 8

Preparation of Polymers

Each of the silicones 1 to 4 obtained in the Examples, and IRGACURE 1173 (Irg 1173) of an amount of 0.5 mass % relative to the silicone were mixed and stirred until a uniform solution was obtained. After the stirring, $N_2$ was blown into the solution for five minutes. The solution was sufficiently deaerated, and poured in a polypropylene mold. The solution was irradiated by UV with a high-pressure

Modulus of Elasticity

Each of the films was soaked in deionized water at 25 degrees C. for 48 hours and, then, water on the surface of the film was wiped away. Thus, the hydrated film was obtained. A Young's modulus of elasticity of the hydrated film was determined using Instron 5943, as followed. A sample piece of 0.8 cm×4.0 cm obtained by cutting the hydrated film was stretched with a load cell of 50 N at a head speed of 1 cm/min to obtain a curve of the stress in the ordinate and the strain in the abscissa. A slope of a stress-strain curve in the initial linear stage was determined. The slope was a Young's modulus of elasticity in MPa.

Contact Angle

The contact angle (°) of each of the hydrated films obtained above with water was determined by a sessile drop method using a contact angle meter CA-D (ex. Kyowa Interface Science Co. Ltd.).

Comparative Examples 3 and 4

In the same manners as in Example 5, hydrogel films were prepared from the silicones 5 and 6 obtained in Comparative Examples 1 and 2, respectively and physical properties of the films were determined. The results are as shown in Table 1.

TABLE 1

|  | Example 5 | Example 6 | Example 7 | Example 8 | Com. Ex.3 | Com. Ex.4 |
|---|---|---|---|---|---|---|
| Silicone Compound | Silicone 1 | Silicone 2 | Silicone 3 | Silicone 4 | Silicone 5 | Silicone 6 |
| Result Equilibrium water content, % | 10.8 | 12.4 | 7.6 | 8.9 | 1.3 | 4.7 |
| Modulus of Elasticity, MPa | 1.9 | 1.5 | 2.3 | 1.3 | 0.12 | 2.1 |
| Contact angle ° | 71 | 69 | 77 | 75 | 96 | 80 |

As seen in Comparative Example 3, the polymer prepared from the silicone having a hydrophilic side chain composed only of polyethylene oxide is inferior in the equilibrium water content, the modulus of elasticity, and the surface wettability. As seen in Comparative Example 4, the silicone having no polybutylene oxide but polypropylene oxide in the side chain has a low amphiphilic property in the side chain and the polymer prepared from the silicone is inferior in the equilibrium water content and the surface wettability.

In contrast, as seen in Examples 5 to 8, the silicone of the present invention provides the polymer excellent in the equilibrium water content, the modulus of elasticity, and the surface wettability. The silicone of the present invention is therefore suited as a silicone for preparing ophthalmic devices.

Example 9

In a 1-liter flask equipped with a stirring device, a dimroth condenser, a thermometer and a dropping funnel, put were 111.6 g (0.128 mol) of the compound represented by the following formula (21) and 430.0 g of toluene and heated to 70 degrees C. 2.14 Grams of a solution of a complex of alkali-neutralized chloroplatinic acid with vinyl siloxane, in toluene, containing 0.5% of platinum, was added in the flask. The amount of platinum was 100 ppm based on the total mass of the reaction substrate and solvent. Then, 100.0 g (0.0142 mol) of the compound represented by the following formula (22) was added dropwise in the flask through the dropping funnel over two hours. Thus, a ratio of the number of unsaturated hydrocarbon group in the compound represented by formula (21) to the number of the SiH group in the compound represented by the following formula (22) was 1.5. The reaction mixture was held at 70 degrees C. for 7 hours and, then, the amount of the remaining SiH group in the reaction mixture was determined by the method described below. The amount of the remaining SiH group was 2% or less of the amount of the SiH group before the reaction, which means that the reaction was completed. The toluene was stripped off at a reduced pressure to obtain 207.3 g of an oily crude product including a compound.

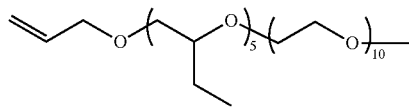

(21)

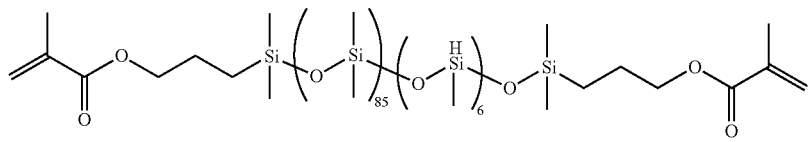

(22)

In the aforesaid formula (21), butylene oxide and ethylene oxide formed each one block structure and bonded in the aforesaid order. The amount of the remaining SiH group was determined in the aforesaid manner. It was converted into a gas generation amount at 0° C. and 1 atm.

To the oily crude product obtained, 300 g of acetone and 100 g of water were added, and the mixture was stirred, followed by standing and separation to obtain a silicone layer as a lower phase. The washing procedure was repeated further twice. The compound represented by the formula (21) was extracted in a water/acetone phase to be removed. 100 Grams of 1-propanol, 0.01 g (100 ppm) of 4-methoxyphenol, and 0.01 g (100 ppm) of 2,6-di-t-butyl-4-methylphenol were added to 240 g of the cloudy lower layer from the extraction followed by filtration through a filter plate. The resulting filtrate was subjected to a stripping at a reduced pressure to obtain 111.1 g of a colorless and transparent oily product which was a highly viscous. A yield was 63.8%. $^1$H-NMR analysis showed that the product was a silicone represented by the following formula (23), hereinafter referred to as silicone 7. In the following formula (23), butylene oxide and ethylene oxide formed each one block structure and bonded in the order as described below.

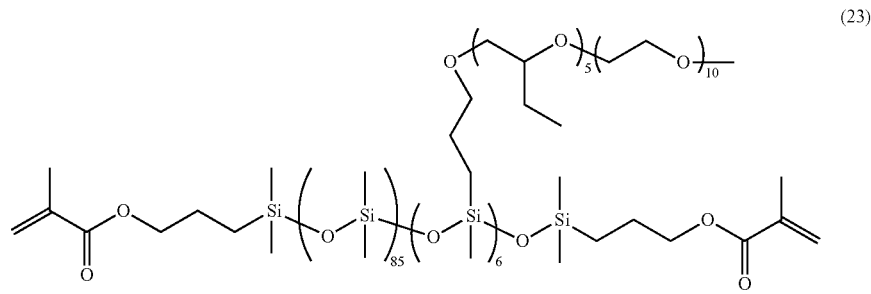

(23)

$^1$H-NMR spectra data of silicone 7 were as shown below. 0.1 ppm (540H), 0.6-0.7 ppm (1.6H), 0.9 ppm (90H), 1.4-1.8 ppm (76H), 1.9 ppm (6H), 3.3-3.7 ppm (360H), 4.1 ppm (4H), 5.5 ppm (2H), 6.1 ppm (2H)

Example 10

The procedures of Example 9 were repeated, except that 111.6 g (0.128 mol) of a compound represented by the following formula (24) was used in place of the compound represented by the formula (21) to thereby obtain 99.6 g of a colorless and transparent silicone which was a highly viscous. A yield was 57.2%. A ratio of the number of the unsaturated hydrocarbon group in the compound represented by formula (24) to the number of the SiH group in the compound represented by the formula (22) was 1.5. $^1$H-NMR analysis showed that the product was a silicone represented by the following formula (25), hereinafter referred to as silicone 8. In the following formulas (24) and (25), butylene oxide and ethylene oxide formed each one block structure and bonded in the order as described below.

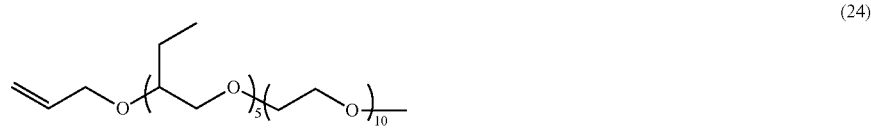

(24)

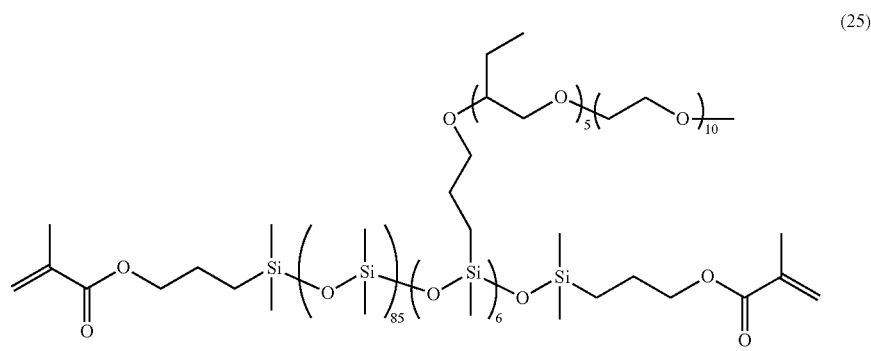

(25)

$^1$H-NMR spectra data of silicone 8 were as shown below. 0.1 ppm (540H), 0.6-0.7 ppm (16H), 0.9 ppm (90H), 1.4-1.8 ppm (76H), 1.9 ppm (6H), 3.3-3.7 ppm (360H), 4.1 ppm (4H), 5.5 ppm (2H), 6.1 ppm (2H)

Comparative Example 5

The procedures of Example 9 were repeated, except that 48.6 g (0.128 mol) of the compound represented by the following formula (26) was used in place of the compound represented by the formula (21) to thereby obtain 98.6 g of an oily product which was pale brown and transparent. A yield was 74.5%. A ratio of the number of the unsaturated hydrocarbon group in the compound represented by formula (26) to the number of the SiH group in the compound represented by the formula (22) was 1.5. $^1$H-NMR analysis showed that the product was a silicone represented by the following formula (27), hereinafter referred to as silicone 9.

Examples 11 and 12 and Comparative Examples 7 and 8 Preparation of Polymer

Each of the silicones obtained in the Examples 9 and 10 and the Comparative Examples 5 and 6, and IRGACURE 1173 (Irg 1173) were mixed in an amount to give 0.5 mass % of the silicone and stirred until a uniform solution was obtained. After the stirring, $N_2$ was blown into the solution for five minutes. The solution was sufficiently deaerated, and poured in a polypropylene mold. The solution was irradiated by UV with a high-pressure mercury lamp to cause curing. The cured product was soaked in isopropanol, a 50% isopropanol aqueous solution, and then deionized water for washing, so that a hydrogel film was obtained. The properties of the obtained hydrogel film were determined according to the following methods. The results are as shown in Table 2.

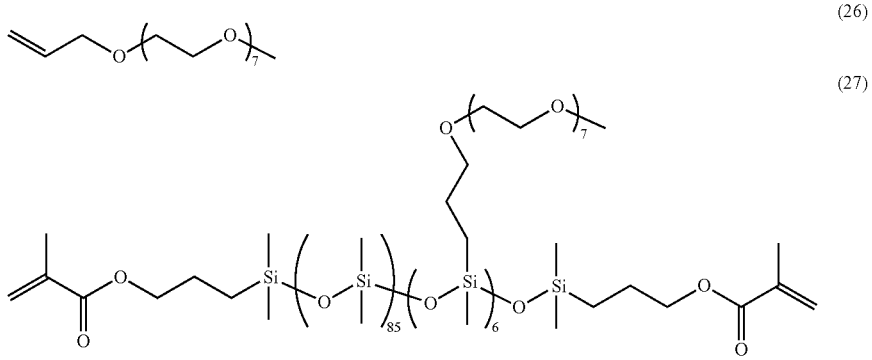

(26)

(27)

Comparative Example 6

The procedures of Example 9 were repeated, except that 102.7 g (0.128 mol) of the compound represented by the following formula (28) was used in place of the compound represented by the formula (21) to thereby obtain 116.3 g of an oily product which was pale brown and transparent. A yield was 69.1%. A ratio of the number of the unsaturated hydrocarbon group in the compound represented by formula (28) to the number of the SiH group in the compound represented by the formula (22) was 1.5. $^1$H-NMR analysis showed that the product was a silicone represented by the following formula (29), hereinafter referred to as silicone 10. In the following formulas (28) and (29), propylene oxide, and ethylene oxide formed each one block structure and bonded in the order as described below.

TABLE 2

|  |  | Example 11 Silicone | Example 12 Silicone | Com. Ex. 7 Silicone | Com. Ex. 8 Silicone |
|---|---|---|---|---|---|
| Silicone | Compound | 7 | 8 | 9 | 10 |
| Result | Equilibrium water content, % | 10.8 | 10.9 | 1.3 | 5.1 |
|  | Modulus of Elasticity, MPa | 1.9 | 1.8 | 0.12 | 2.4 |
|  | Contact angle, ° | 71 | 70 | 96 | 81 |

As seen in Comparative Example 7, the polymer prepared from the silicone having a hydrophilic side chain composed only of polyethylene oxide is inferior in the equilibrium water content, the modulus of elasticity, and the surface

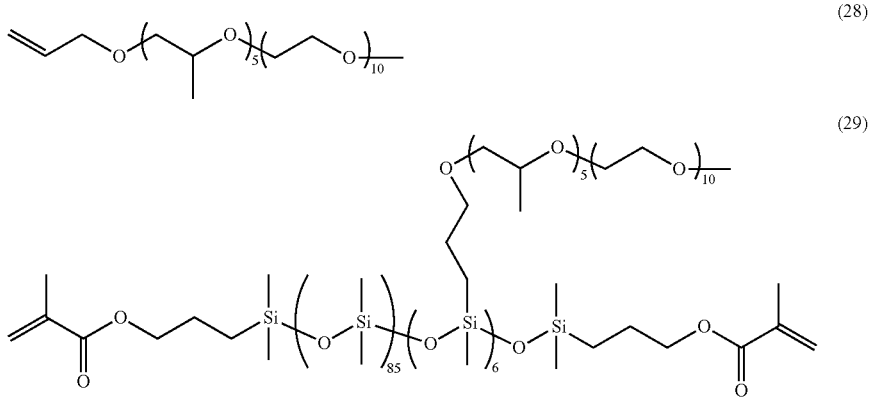

(28)

(29)

wettability. As seen in Comparative Example 8, the silicone having no polybutylene oxide but polypropylene oxide in the side chain has a low amphiphilic property in the side chain and the polymer prepared from the silicone is inferior in the equilibrium water content and the surface wettability. In contrast, as seen in Examples 11 and 12, the silicone of the present invention may provide a polymer excellent the equilibrium water content, the modulus of elasticity, and the surface wettability.

INDUSTRIAL APPLICABILITY

The silicone of the present invention provides a polymer excellent in equilibrium water content, modulus of elasticity, and surface wettability. Accordingly, the present silicone and the present method for the preparation thereof are useful for preparing ophthalmic devices such as contact lenses, e.g. hydrophilic contact lenses and silicone hydrogels, intraocular lenses and artificial corneas.

The invention claimed is:

1. A silicone represented by the following formula (1):

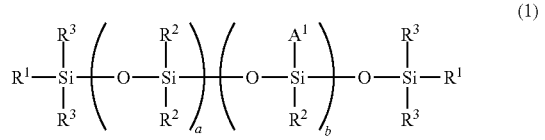

(1)

wherein $R^1$ is a group represented by the following formula (2):

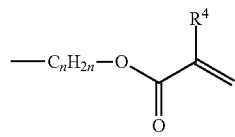

(2)

wherein n is an integer of 2 to 8 and $R^4$ is a methyl group or a hydrogen atom, "a" is an integer of 1 to 500, b is an integer of 1 to 100, provided that a+b is 50 to 600, the siloxane units in the aforesaid parentheses may be bonded in a block or at random, $R^2$ is, independently of each other, a substituted or unsubstituted monovalent hydrocarbon group having 1 to 10 carbon atoms, $R^3$ is, independently of each other, an alkyl group having 1 to 6 carbon atoms, $A^1$ is a group represented by the following formula (3) or (3'):

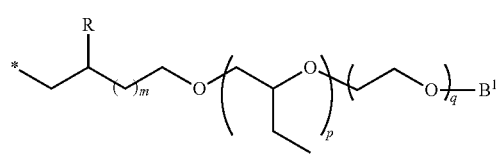

(3)

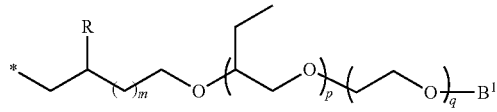

(3')

wherein, in formula (3) and (3'):
R is a hydrogen atom or a methyl group,
$B^1$ is a hydrogen atom, an alkyl group having 1 to 6 carbon atoms, an aralkyl group having 7 to 12 carbon atoms, or an acyl group having 1 to 6 carbon atoms,
m is an integer of 0 to 8,
p is an integer of 1 to 10,
q is an integer of 1 to 50,
* is a position of bonding to a silicon atom, and
the polyether units in the parentheses are bonded in the above-described order.

2. The silicone according to claim 1, wherein $A^1$ is represented by the following formula:

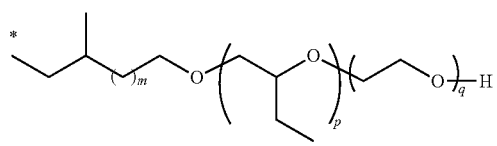

wherein m is an integer of 0 to 8, p is an integer of 1 to 10, q is an integer of 1 to 50, and the polyether units in the parentheses are bonded in the above-described order.

3. The silicone according to claim 1, wherein $A^1$ is represented by one of the following formulas:

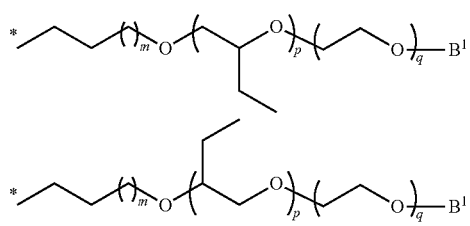

wherein $B^1$ is a hydrogen atom, an alkyl group having 1 to 6 carbon atoms, an aralkyl group having 7 to 12 carbon atoms, or an acyl group having 1 to 6 carbon atoms, m is an integer of 0 to 8, p is an integer of 1 to 10, q is an integer of 1 to 50, and the polyether units in the parentheses are bonded in the above-described order.

4. The silicone according to claim 1, wherein m is 1 in the formulas (3) and (3').

5. A polymer comprising repeating units derived by addition polymerization of the group represented by the aforesaid formula (2) in the silicone according to claim 1.

6. A copolymer comprising repeating units derived by copolymerization of the group represented by the aforesaid formula (2) in the silicone according to claim 1 with another compound having a group polymerizable with the group represented by the formula (2).

7. A method for preparing a silicone represented by the following formula (1):

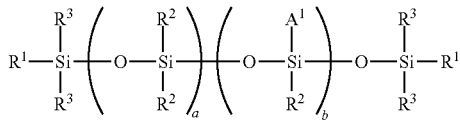

wherein $R^1$ is a group represented by the following formula (2):

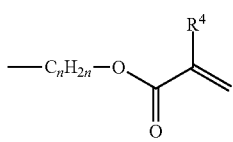

wherein n is an integer of 2 to 8 and $R^4$ is a methyl group or a hydrogen atom, "a" is an integer of 1 to 500, b is an integer of 1 to 100, provided that a+b is 50 to 600, the siloxane units in the aforesaid parentheses may be bonded in a block or at random, $R^2$ is, independently of each other, a substituted or unsubstituted monovalent hydrocarbon group having 1 to 10 carbon atoms, $R^3$ is, independently of each other, an alkyl group having 1 to 6 carbon atoms, $A^1$ is a group represented by the following formula (3) or (3'):

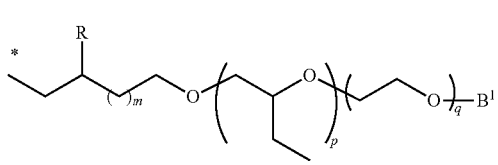

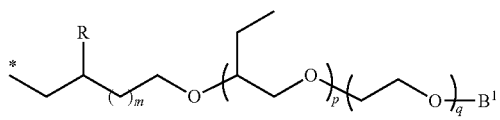

wherein, in, formula (3) and (3'):
R is a hydrogen atom or a methyl group,
$B^1$ is a hydrogen atom, an alkyl group having 1 to 6 carbon atoms, an aralkyl group having 7 to 12 carbon atoms, or an acyl group having 1 to 6 carbon atoms,
m is an integer of 0 to 8,
p is an integer of 1 to 10,
q is an integer of 1 to 50,
* is a position of bonding to a silicon atom, and
the polyether units in the parentheses are bonded in the above-described order;
wherein the method comprises a step of addition-reacting an organohydrogenpolysiloxane represented by the following formula (4):

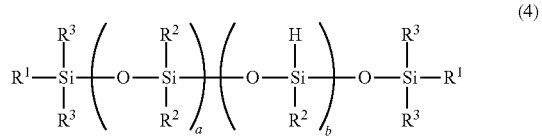

wherein $R^1$, $R^2$, $R^3$, a and b are as defined above,
with a compound represented by the following formula (5) or (5'):

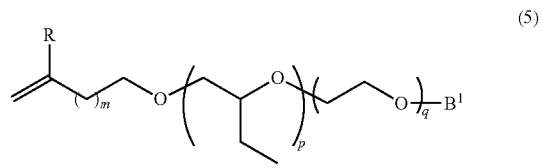

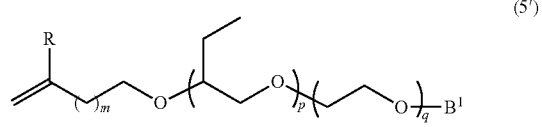

wherein R is a hydrogen atom or a methyl group, $B^1$ is a hydrogen atom, an alkyl group having 1 to 6 carbon atoms, an aralkyl group having 7 to 12 carbon atoms, or an acyl group having 1 to 6 carbon atoms, m is an integer of 0 to 8, p is an integer of 1 to 10, q is an integer of 1 to 50, and the polyether units in the parentheses are bonded in the above-described order, to obtain the silicone represented by the formula (1).

8. The method according to claim 7, wherein $A^1$ is represented by the following formula:

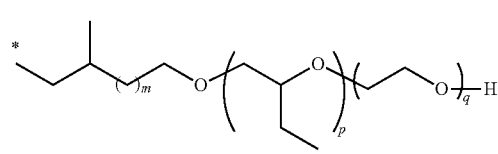

wherein m is an integer of 0 to 8, p is an integer of 1 to 10, q is an integer of 1 to 50, and the polyether units in the parentheses are bonded in the above-described order.

9. The method according to claim 7, wherein $A^1$ is represented by one of the following formulas:

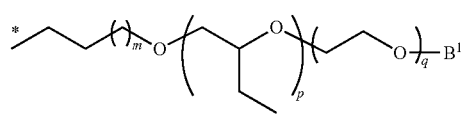

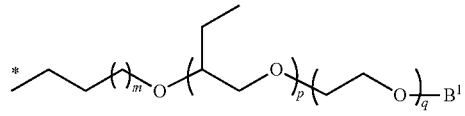

wherein $B^1$ is a hydrogen atom, an alkyl group having 1 to 6 carbon atoms, an aralkyl group having 7 to 12 carbon atoms, or an acyl group having 1 to 6 carbon atoms, m is an integer of 0 to 8, p is an integer of 1 to 10, q is an integer of 1 to 50, and the polyether units in the parentheses are bonded in the above-described order.

10. The method according to claim 7, the method further comprises a step of subjecting the obtained silicone to a purification step with an adsorbent and/or a filtering material.

11. The method according to claim 7, wherein m is 1 in the formulas (3) and (3').

12. A polymer comprising repeating units derived by addition polymerization of the group represented by the aforesaid formula (2) in the silicone according to claim 2.

13. A polymer comprising repeating units derived by addition polymerization of the group represented by the aforesaid formula (2) in the silicone according to claim 3.

14. A polymer comprising repeating units derived by addition polymerization of the group represented by the aforesaid formula (2) in the silicone according to claim 4.

15. A copolymer comprising repeating units derived by copolymerization of the group represented by the aforesaid formula (2) in the silicone according to claim 2 with another compound having a group polymerizable with the group represented by the formula (2).

16. A copolymer comprising repeating units derived by copolymerization of the group represented by the aforesaid formula (2) in the silicone according to claim 3 with another compound having a group polymerizable with the group represented by the formula (2).

17. A copolymer comprising repeating units derived by copolymerization of the group represented by the aforesaid formula (2) in the silicone according to claim 4 with another compound having a group polymerizable with the group represented by the formula (2).

18. The method according to claim 8, the method further comprises a step of subjecting the obtained silicone to a purification step with an adsorbent and/or a filtering material.

19. The method according to claim 9, the method further comprises a step of subjecting the obtained silicone to a purification step with an adsorbent and/or a filtering material.

20. The method according to claim 8, wherein m is 1 in the formulas (3) and (3').

* * * * *

UNITED STATES PATENT AND TRADEMARK OFFICE
CERTIFICATE OF CORRECTION

PATENT NO. : 11,840,608 B2
APPLICATION NO. : 17/636054
DATED : December 12, 2023
INVENTOR(S) : Muneo Kudo It is certified that error appears in the above-identified patent and that said Letters Patent is hereby corrected as shown below:

In the Specification

Column 2, Line 17: Please correct "naphthyhnethyl," to read --naphthylmethyl,--

Column 3, Line 7: Please correct "(I)" to read --(1)--

Column 6, Line 37: Please correct "formula (1), is," to read --formula (1), $R^2$ is,--

Column 7, Line 39: Please correct "in is an integer" to read --m is an integer--

Column 7, Line 51: Pleases correct "in is 1" to read --m is 1--

Column 12, Line 6: Please correct "Sill" to read --SiH--

Column 13, Line 32: Please correct "Sill" to read --SiH--

Column 14, Line 18: Please correct "(1611)" to read --(16H)--

Column 17, Line 29: Please correct "SIR" to read --SiH--

Signed and Sealed this
Twenty-sixth Day of November, 2024

Katherine Kelly Vidal
*Director of the United States Patent and Trademark Office*